United States Patent
Choi et al.

(10) Patent No.: US 10,088,959 B2
(45) Date of Patent: Oct. 2, 2018

(54) CAPACITIVE TYPE TOUCH SENSING DEVICE

(71) Applicant: Samsung Display Co., Ltd., Yongin, Gyeonggi-Do (KR)

(72) Inventors: Jae Won Choi, Hwaseong-si (KR); Hak Sun Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 693 days.

(21) Appl. No.: 14/061,269

(22) Filed: Oct. 23, 2013

(65) Prior Publication Data

US 2015/0009421 A1    Jan. 8, 2015

(30) Foreign Application Priority Data

Jul. 5, 2013   (KR) .......................... 10-2013-0079258

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC .................................. G06F 3/041; G06F 3/044
USPC ................................................. 345/173–179
See application file for complete search history.

(56) References Cited

U.S. PATENT DOCUMENTS

| | | | |
|---|---|---|---|
| 7,663,607 B2 * | 2/2010 | Hotelling | G06F 3/0416 178/18.01 |
| 7,986,152 B2 | 7/2011 | Philipp et al. | |
| 8,410,795 B1 | 4/2013 | Peng | |
| 9,013,441 B2 * | 4/2015 | Kremin | G06F 3/0416 178/18.03 |
| 2009/0309851 A1 * | 12/2009 | Bernstein | G06F 3/0416 345/174 |
| 2010/0060593 A1 * | 3/2010 | Krah | G06F 3/0416 345/173 |
| 2010/0163394 A1 * | 7/2010 | Tang | G06F 3/0416 200/600 |
| 2011/0304578 A1 | 12/2011 | Kim et al. | |
| 2012/0050216 A1 | 3/2012 | Kremin et al. | |

(Continued)

FOREIGN PATENT DOCUMENTS

| | | |
|---|---|---|
| CN | 102368187 A | 3/2012 |
| KR | 100967663 B1 | 6/2010 |
| KR | 1020110069632 A | 6/2011 |

(Continued)

OTHER PUBLICATIONS

Chinese Office Action for Application No. 201410038692.9 dated Jan. 17, 2018.

*Primary Examiner* — Nelson Rosario
*Assistant Examiner* — Andrew Lee
(74) *Attorney, Agent, or Firm* — Cantor Colburn LLP

(57) ABSTRACT

A touch sensing device includes: a touch panel including a plurality of first electrodes arranged substantially in a matrix form and a plurality of second electrodes arranged substantially in a matrix form; and a sensing signal control unit connected to the touch panel, where the sensing signal control unit includes a first switching block, and the first switching block includes a plurality of first switches which are connected between a plurality of first signal lines connected to the first electrodes and a plurality of first track lines crossing the first signal lines.

17 Claims, 15 Drawing Sheets

(56) References Cited

U.S. PATENT DOCUMENTS

2012/0262419 A1   10/2012  Hershman et al.
2013/0249858 A1*  9/2013  Chang .................... G06F 3/044
                                                    345/174

FOREIGN PATENT DOCUMENTS

| KR | 1020110112490 A | 10/2011 |
| KR | 101141937 B1 | 4/2012 |
| KR | 1020120056033 A | 6/2012 |
| KR | 1020120111673 A | 10/2012 |
| KR | 1020120116867 A | 10/2012 |
| KR | 1020130018600 A | 2/2013 |

* cited by examiner

FIG. 10
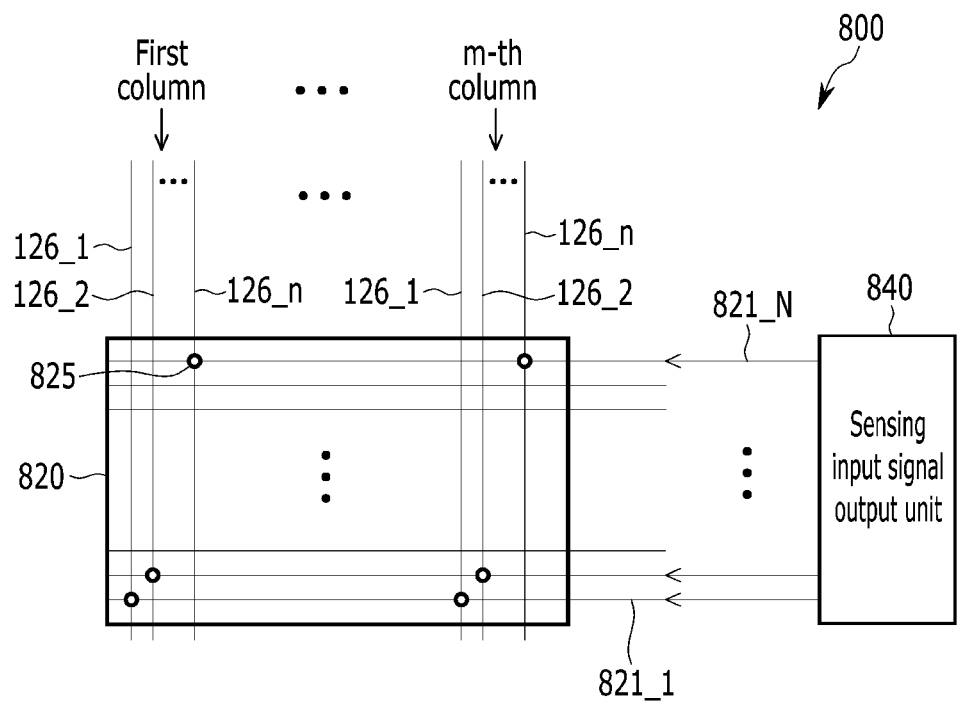
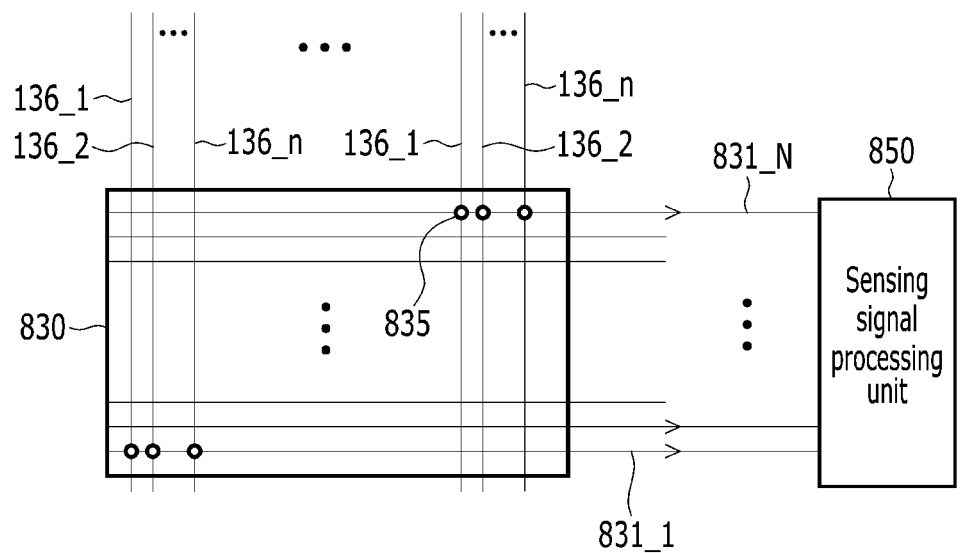

FIG. 12
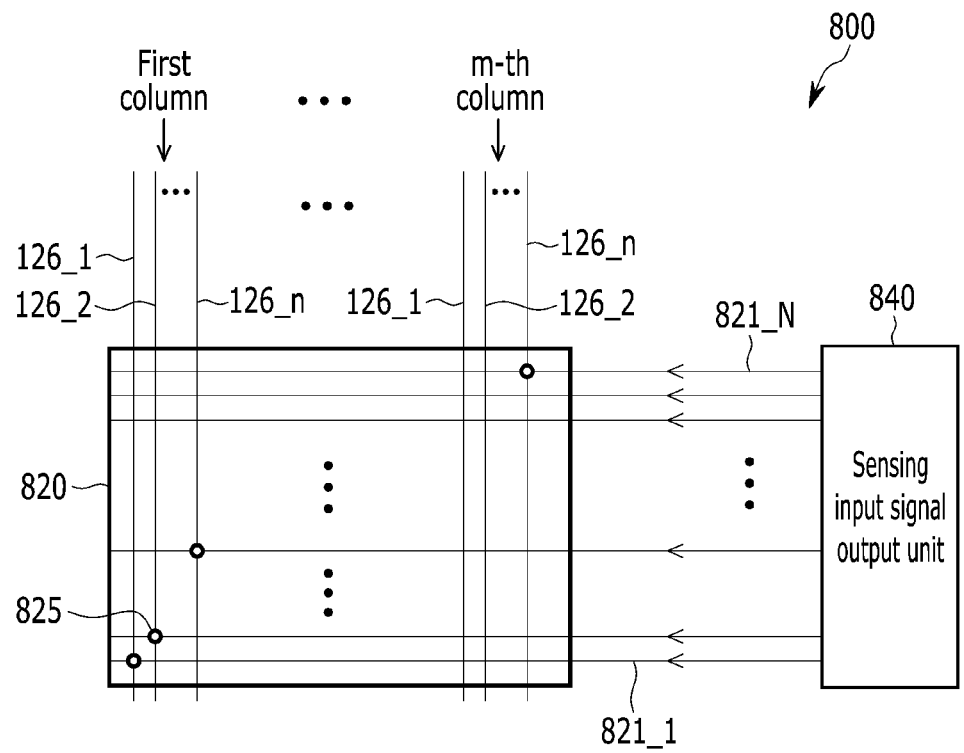
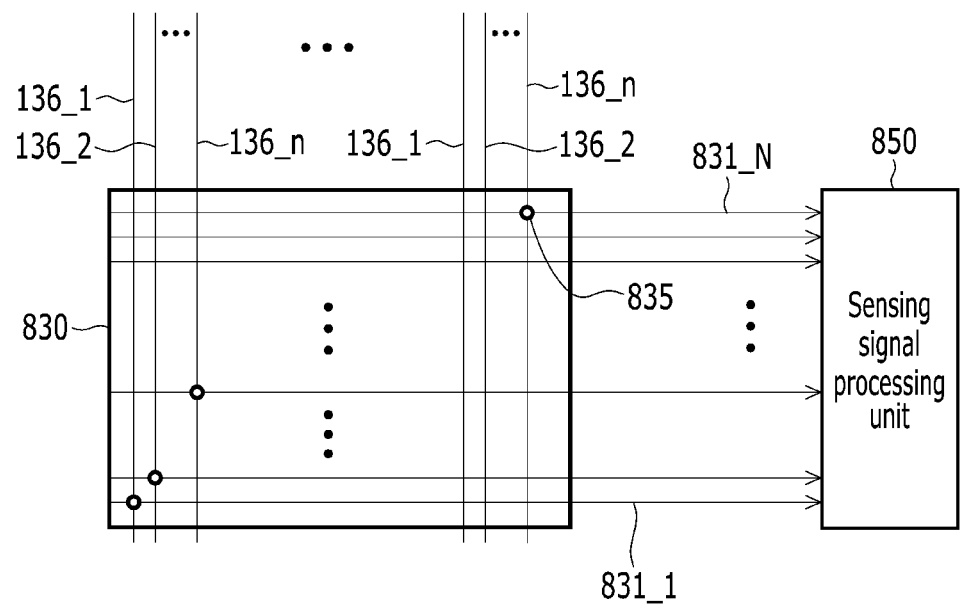

FIG. 13
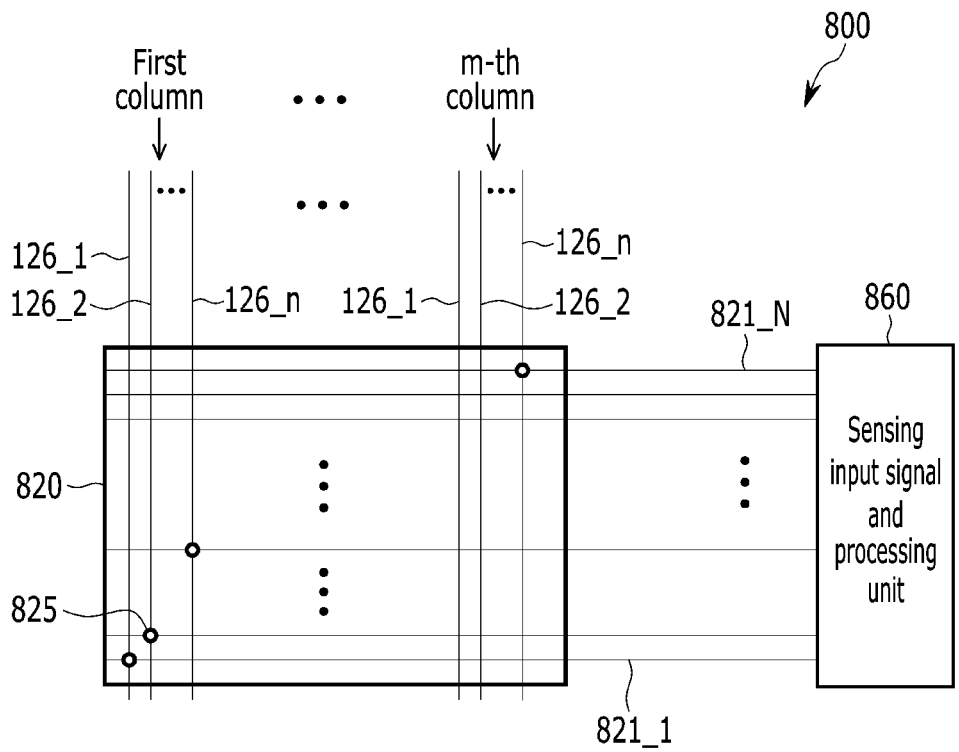
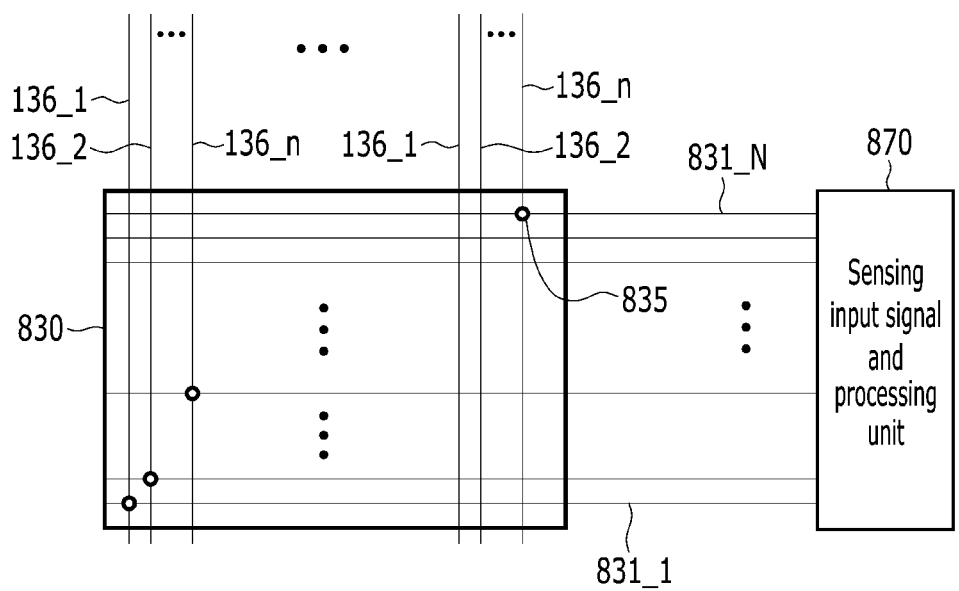

CAPACITIVE TYPE TOUCH SENSING DEVICE

This application claims priority to Korean Patent Application No. 10-2013-0079258, filed on Jul. 5, 2013, and all the benefits accruing therefrom under 35 U.S.C. § 119, the content of which in its entirety is herein incorporated by reference.

BACKGROUND (a) Field

Exemplary embodiments of the invention relate to a capacitive type touch sensing device and a driving method thereof.

(b) Description of the Related Art

Functions of displays, such as a liquid crystal display and an organic light emitting diode display, a portable transmission device, other information processing device and the like, for example, are typically performed using various input devices. Recently, an input device including a touch sensing device has been widely used.

The touch sensing device typically includes a touch sensor and a control unit. The touch sensor may be classified into various types, such as a resistive type, a capacitive type, an electro-magnetic type ("EM"), and an optical type, for example.

The capacitive type touch sensor typically includes a sensing capacitor including a plurality of sensing electrodes that receives a sensing signal and detects a change in capacitance of the sensing capacitor generated when a conductor, such as a finger, approaches the touch sensor, thereby detects an occurrence and location of the touch, for example.

The touch sensor may be provided in a touch panel which may be attached on a display (e.g., add-on cell type), may be disposed outside a substrate of the display (e.g., on-cell type), or may be disposed within the display (e.g., in-cell type). The display including the touch sensor detects a touch on a screen by a user's finger, a touch pen, or the like, and information on touched positions.

SUMMARY

Exemplary embodiments of the invention relate to a touch sensing device including a touch panel having a simple stack structure.

In such embodiments, a connection between a plurality of sensing electrodes in the touch panel is freely defined or controlled to allow an effective operation thereof in various states and use environments of the touch sensing device.

In such embodiments, the touch sensing device senses a touch thereon by various methods for freely controlling a disconnection between the sensing electrodes to allow the sensing electrodes to form a mutual sensing capacitor or a self-sensing capacitor.

According to an exemplary embodiment of the invention, a touch sensing device includes: a touch panel including a plurality of first electrodes arranged substantially in a matrix form and a plurality of second electrodes arranged substantially in a matrix form; and a sensing signal control unit connected to the touch panel, where the sensing signal control unit includes a first switching block, in which the first switching block includes a plurality of first switches which are connected between a plurality of first signal lines connected to the first electrodes and a plurality of first track lines crossing the first signal lines.

In an exemplary embodiment, a portion of the first signal lines may be connectable to each other through the first switches which are short-circuited in the first switching block.

In an exemplary embodiment, a portion of the second electrodes disposed in a same column or in a same row among the second electrodes may be connectable to each other through a connector in the touch panel.

In an exemplary embodiment, a portion of the first signal lines connected to first electrodes disposed in a same row or in a same column among the first electrodes may be connectable to each other through the first switches which are short-circuited in the first switching block.

In an exemplary embodiment, one of a first electrode of the first electrodes and a second electrode of the second electrodes may receive a sensing input signal from the sensing signal control unit, and the other of the first electrode and the second electrode may output a sensing output signal to the sensing signal control unit.

In an exemplary embodiment, the first electrode and the second electrode may be neighboring each other, and the first electrode and the second electrode may form a mutual sensing capacitor.

In an exemplary embodiment, the first signal lines may be respectively connectable to different first track lines from each other through the first switches which are short-circuited in the first switching block.

In an exemplary embodiment, the sensing signal control unit may further include a second switching block, and the second switching block may include a plurality of second switches which are connected between a plurality of second signal lines connected to the second electrodes and a plurality of second track lines crossing the second signal lines.

In an exemplary embodiment, a portion of the second signal lines may be connectable to each other through the second switches which are short-circuited in the second switching block.

In an exemplary embodiment, a portion of the first signal lines connected to first electrodes disposed in a same row or in a same column among the first electrodes may be connectable to each other through the first switches which are short-circuited in the first switching block.

In an exemplary embodiment, a portion of the second signal lines connected to second electrodes disposed in a same row or in a same column among the second electrodes may be connectable to each other through the second switches which are short-circuited in the second switching block.

In an exemplary embodiment, one of a first electrode of the first electrodes and a second electrode of the second electrodes may receive a sensing input signal, and the other of the first electrode and the second electrode may output a sensing output signal.

In an exemplary embodiment, the first signal lines may be respectively connectable to different first track lines from each other through the first switches which are short-circuited in the first switching block.

In an exemplary embodiment, the second signal lines may be respectively connectable to different second track lines from each other through the second switches which are short-circuited in the second switching block.

In an exemplary embodiment, each of the first electrode and the second electrode may receive the sensing input signal and output the sensing output signal.

In an exemplary embodiment, each of the first electrode and the second electrode may form a self-sensing capacitor.

According to exemplary embodiments of the invention, the touch sensing device includes the touch panel having the simple stack structure. In such embodiments, the connections between the sensing electrodes are freely defined based on the state and use environment of the touch sensing device. In such embodiments, the touch sensing device senses a touch thereon using various methods by freely defining the disconnection between the sensing electrodes to allow the sensing electrodes to freely form the mutual sensing capacitor or the self-sensing capacitor.

BRIEF DESCRIPTION OF THE DRAWINGS

The above and other features of the invention will become more apparent by describing in detail exemplary embodiments thereof with reference to the attached drawings, in which:

FIGS. 10 to 13 are block diagrams showing alternative exemplary embodiments of a sensing signal control unit of the touch sensing device according to the invention.

DETAILED DESCRIPTION

Figure 1:
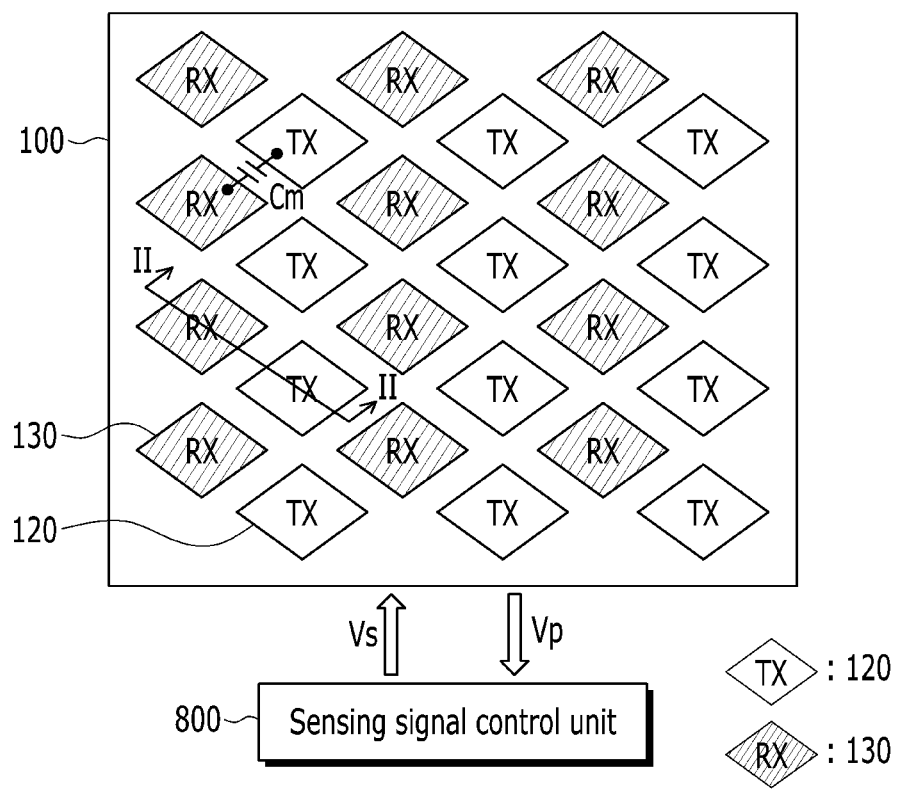
FIG. 1 is a block diagram showing an exemplary embodiment of a touch sensing device according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

First, an exemplary embodiment of a touch sensing device according to the invention will be described with reference to FIGS. 1 and 2.

Figure 2:
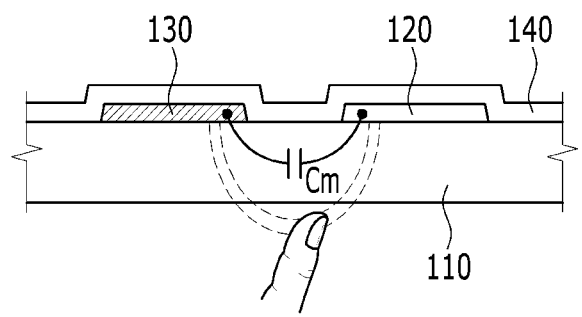
FIG. 2 is a cross-sectional view taken along line II-II of the touch sensing device illustrated in FIG. 1.

FIG. 1 is a block diagram showing an exemplary embodiment of a touch sensing device according to the invention, and FIG. 2 is a cross-sectional view taken along line II-II of the touch sensing device illustrated in FIG. 1.

Referring to FIG. 1, an exemplary embodiment of the touch sensing device according to the invention, which is a device that senses a touch of an external object thereon, includes a touch panel 100, which the external object touches, and a sensing signal control unit 800 which controls touch sensing.

Herein, the touch of the external object includes a direct touch of the external object such as a user's hand, for example, on the touch panel 100, or an approach of the external object to the touch panel 100.

The touch panel 100 includes a plurality of sensing input electrodes 120 (also referred to as "TX") and a plurality of sensing output electrodes 130 (also referred to as "RX"). The sensing input electrode 120 and the sensing output electrode 130 are separated from each other.

The sensing input electrodes 120 may be arranged in a substantial matrix form, and the sensing output electrodes 130 may be arranged in a substantial matrix form. A row of the sensing output electrodes 130 may be disposed between neighboring rows of the sensing input electrodes 120, and a column of the sensing output electrodes 130 may be disposed between neighboring columns of the sensing input electrodes 120.

In an exemplary embodiment of the touch panel 100, at least a portion of the sensing input electrodes 120 may be connected to each other or separated from each other. In such an embodiment of the touch panel 100, at least a portion of the sensing output electrodes 130 may be connected to each other or separated from each other. The sensing input electrodes 120 connected to each other in the touch panel 100 may be arranged in a same column, and the sensing output electrodes 130 connected to each other in the touch panel 100 may be arranged in a same column. In an exemplary embodiment, the sensing input electrodes 120 disposed in a column in the touch panel 100 are connected to each other, and the sensing output electrodes 130 may be separated from each other. In an alternative exemplary embodiment, the sensing output electrodes 130 disposed in a column in the touch panel 100 are connected to each other, and the sensing input electrodes 120 may be separated from each other.

In an exemplary embodiment, the sensing input electrode 120 and the sensing output electrode 130 may include a transparent conductive material, such as indium tin oxide ("ITO"), indium zinc oxide ("IZO"), and a thin metal layer, for example, but are not limited thereto.

In an exemplary embodiment, each of the sensing input electrodes 120 and the sensing output electrodes 130 may have a quadrangle shape, for example, a diamond shape as illustrated in FIG. 1, but not being limited thereto. In an alternative exemplary embodiment, each of the sensing input electrodes 120 and the sensing output electrodes 130 may have various shapes. In an exemplary embodiment, a size of the sensing input electrode 120 and the sensing output electrode 130 may be determined based on a touched object and a touch method. In one exemplary embodiment, for example, a length of a side of each of the sensing input electrodes 120 and the sensing output electrodes 130 may be about several millimeters.

Referring to FIG. 2, the sensing input electrodes 120 and the sensing output electrodes 130 may be disposed on a substrate 110. In an exemplary embodiment, the touch panel 100 may be configured to be attached on a display (e.g., add-on cell type), and the substrate 110 of the touch panel 100 may be prepared separately from a substrate of the display. In an alternative exemplary embodiment, the sensing input electrodes 120 and the sensing output electrodes 130 may be disposed outside the substrate of the display (e.g., on-cell type) or inside the substrate of the display (e.g., in-cell type), and the substrate of the display may be the substrate 110 of the touch panel 100.

In an exemplary embodiment, as shown in FIG. 2, an insulating layer 140 may be disposed on the sensing input electrode 120 and the sensing output electrode 130.

According to an exemplary embodiment of the invention, the sensing input electrodes 120 and the sensing output electrodes 130 are disposed in a same layer as each other, and may be provided, e.g., formed, on the substrate 110 using a single optical mask. In an exemplary embodiment, where the sensing input electrodes 120 connected to each other or the sensing output electrodes 130 connected to each other in the touch panel 100 is disposed on the substrate 110, a wiring for connecting between the sensing input electrodes 120 or a wiring for connecting between the sensing output electrodes 130 may be disposed in the same layer as the sensing input electrode 120 and the sensing output electrode 130. In such an embodiment, the wiring for connecting between the sensing input electrodes 120 or the wiring for connecting between the sensing output electrodes 130 is between the substrate 110 and the insulating layer 140.

In such an embodiment, a stack structure of the touch panel 100 including the sensing input electrode 120 and the sensing output electrode 130 may be substantially simplified.

Referring to FIGS. 1 and 2, each of the single sensing input electrodes 120 may neighbor at least a portion of the sensing output electrodes 130, for example, four sensing output electrodes 130, and each of the single sensing output electrodes 130 may neighbor the sensing input electrodes 120, for example, four sensing input electrodes 120.

The sensing input electrodes 120 and the sensing output electrodes 130 which neighbor each other form a sensing capacitor Cm. The sensing capacitor Cm functions as the touch sensor, and may be a mutual sensing capacitor. The sensing capacitor Cm may receive a sensing input signal Vs through the sensing input electrode 120, and output a sensing output signal Vp based on a change in a charge amount therein due to a touch of external objects thereon.

The sensing signal control unit 800 is connected to the sensing input electrodes 120 and the sensing output electrodes 130 of the touch panel 100. The sensing signal control unit 800 transfers the sensing input signal Vs to the sensing input electrodes 120, and receives the sensing output signal Vp from the sensing output electrodes 130. The sensing signal control unit 800 processes the sensing output signal Vp, and generates touch information, such as an occurrence and location of the touch on the touch panel 100, based on the sensing output signal Vp.

First, an operation of an exemplary embodiment of the touch sensing device according to the invention will be described with reference to FIGS. 1 and 2.

In an exemplary embodiment, when the sensing input signal Vs is input from the sensing signal control unit 800 to the sensing input electrodes 120, the sensing capacitor Cm is charged with a predetermined charge amount. The sensing input signal Vs may be sequentially input to the rows of the sensing input electrodes 120, or may be simultaneously input to the rows of the sensing input electrode 120.

In such an embodiment, when a touch occurs on the touch panel 100 by an external object, the charge amount of the sensing capacitor Cm is changed, and the sensing output signal Vp is thereby output through the sensing output electrode 130. A voltage level of the sensing output signal Vp when the touch occurs on the touch panel 100 by the external object may be lower than a voltage level of the sensing output signal Vp when no touch occurs on the touch panel 100.

The sensing signal control unit 800 receives the sensing output signal Vp and performs sampling and analog-to-digital ("A/D") conversion on the received sensing output signal Vp to generate a digital sensing signal. The sensing signal control unit 800 or a separately provided circuit may perform an operation processing on the digital sensing signal to generate the touch information, such as the occurrence or location of the touch on the touch panel 100.

Next, an alternative exemplary embodiment of a touch sensing device according to the invention will be described with reference to FIGS. 3 to 5, along with FIGS. 1 and 2.

Figure 3:
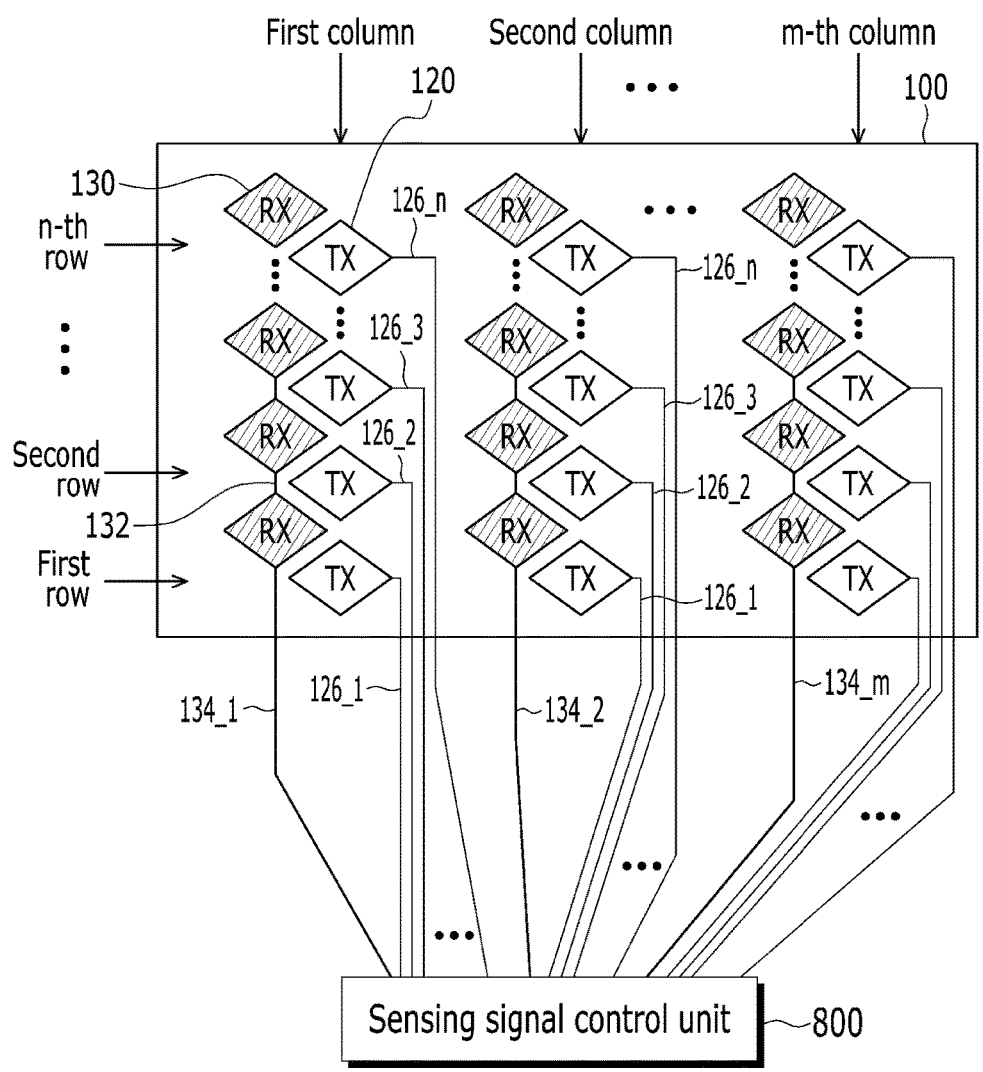
FIG. 3 is a block diagram an alternative exemplary embodiment of a touch sensing device according to the invention.
Figure 4:
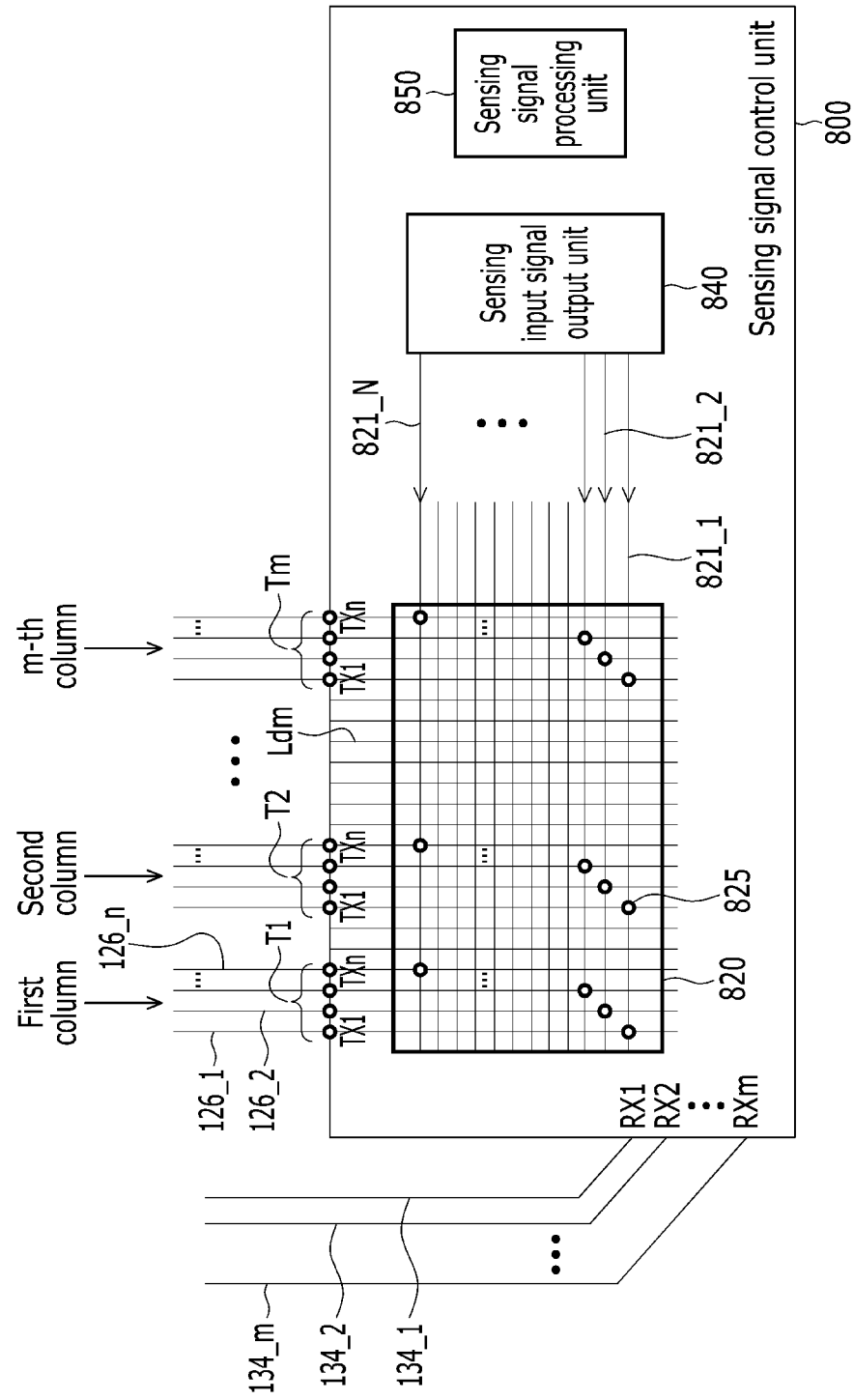
FIGS. 4 and 5 are block diagrams showing an exemplary embodiment of a sensing signal control unit of the touch sensing device according to the invention.
Figure 5:
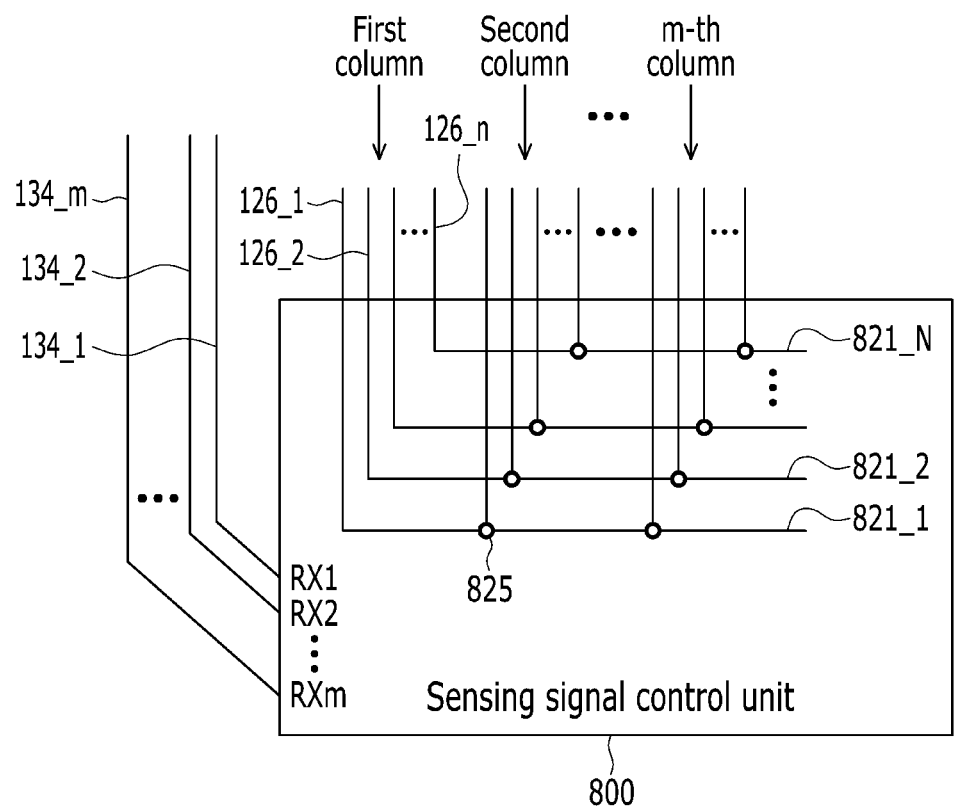

FIG. 3 is a block diagram showing an alternative exemplary embodiment of a touch sensing device according to the invention, and FIGS. 4 and 5 are block diagrams showing an exemplary embodiment of a sensing signal control unit of the touch sensing device according to the invention.

According to an exemplary embodiment of the invention, the sensing input electrodes 120 and the sensing output electrodes 130 may each be arranged substantially in a form of a n×m matrix (here, each of n and m is a natural number).

Referring to FIG. 3, an exemplary embodiment of the touch panel 100 of the touch sensing device according to the invention is substantially the same as the above-mentioned exemplary embodiment, and at least a portion of the sensing output electrodes 130 disposed on the touch panel 100 may be connected to each other. In such an embodiment, the sensing output electrodes 130 arranged in a same column may be connected to each other through a connector 132, and the sensing output electrodes 130 arranged in different columns may be separated from each other, e.g., not be connected to each other. Each column of the sensing output electrodes 130 may be connected to the sensing signal control unit 800 through a corresponding output signal line of a plurality of output signal lines 134_1, 134_2, ..., 134_m.

The sensing input electrodes 120 may be separated from each other in the touch panel 100. The sensing input electrodes 120 disposed in each column of the touch panel 100 may be connected to the sensing signal control unit 800 through n input lines 126_1, 126_2, ..., 126_n. The input signal lines 126_1, 126_2, ..., 126_n connected to the sensing input electrodes 120 may each be divided into m groups, each including the n input signal lines 126_1, 126_2, ..., 126_n.

According to an exemplary embodiment of the invention, the sensing input electrodes 120 or the wiring connected to the sensing input electrodes 120 may not cross the sensing output electrodes 130 or the wirings connected to the sensing output electrodes 130, such that an additional connector, which may be disposed in a layer different from the sensing input electrodes 120 and the sensing output electrode 130, may be omitted as described above. Therefore, in such an embodiment, the stack structure of the touch panel 100 including the sensing input electrodes 120 and the sensing output electrodes 130 may be substantially simplified.

Referring to FIG. 4, the output signal lines 134_1, 134_2, ..., 134_m connected to the rows of the sensing output electrodes 130, respectively, may be connected to a plurality of input terminals RX1, RX2, ..., RXm of the sensing signal control unit 800.

The input signal lines 126_1, 126_2, ..., 126_n of the m groups connected to the sensing input electrodes 120 may be connected to m output terminal groups T1, T2, ..., Tm of the sensing signal control unit 800, respectively. Each of the output terminal groups T1, T2, ..., Tm may include n output terminals TX1, ..., TXn.

Referring to FIG. 4, an exemplary embodiment of the sensing signal control unit 800 according to the invention may include a switching block 820, a sensing input signal output unit 840 and a sensing signal processing unit 850.

In such an embodiment, the switching block 820 may be implemented in an integrated circuit ("IC") form, and include a plurality of switches which may control a connection (e.g., connect or disconnect) between the input signal lines 126_1, 126_2, ..., 126_n of the m groups and a plurality of track lines 821_1, 821_2, ..., 821_N (here, N is a natural number) crossing the input signal lines. In FIG. 4, the switches may be disposed at cross points between the input signal lines 126_1, 126_2, ..., 126_n and the track lines 821_1, 821-2, ..., 821_N. In an exemplary embodiment, the switches that controls a connection between the input signal lines 126_1, 126_2, ..., 126_n and the track lines 821_1, 821_2, ..., 821_N may form short-circuited points 825. In such an embodiment, the positions of the short-circuited points 825 may be freely changed or controlled using a software-based control algorithm, for example.

The input signal lines 126_1, 126_2, ..., 126_n of the touch panel 100 may be connected to an inside of the switching block 820 of the sensing signal control unit 800 through the output terminals TX1, TXn. The switching block 820 may further include a dummy wiring Ldm, and the dummy wiring Ldm may extend outside the switching block 820.

The number of the track lines 821_1, 821_2, ..., 821_N may be n or more. The track lines 821_1, 821_2, ..., 821_N may extend outside the switching block 820 to be connected to the sensing input signal output unit 840.

Referring to FIG. 4, in an exemplary embodiment, at least one of the input signal lines 126_1, 126_2, ..., 126_n of each group are electrically connectable to at least one of the input signal lines 126_1, 126_2, ..., 126_n of another group through the short-circuited points 825. In one exemplary embodiment, for example, the input signal lines 126_1 connected to the sensing input electrodes 120 disposed in a first row of the touch panel 100 are connectable to a same corresponding track line, e.g., a first track line 821_1, through the shorted-circuit points 825, the input signal lines 126_2 connected to the sensing input electrodes 120 disposed in a second row of the touch panel 100 are connectable to a same corresponding track line, e.g., a second track line 821_2, through the short-circuited points 825, and the input signal lines 126_n connected to the sensing input electrodes 120 disposed in a n-th row of the touch panel 100 are connectable to a same corresponding track line, e.g., N-th track line 821-N, through the short-circuited points 825. In such an embodiment, N may be equal to n.

FIG. 5 schematically illustrates the input signal lines 126_1, 126_2, . . . , 126_N connected to each other through the short-circuited points 825 and n track lines 821_1, 821_2, . . . , 821_n within the switching block 820 illustrated in FIG. 4.

As shown in FIG. 5, in an exemplary embodiment, the sensing input electrodes 120 disposed in a same row in the touch panel 100 are separated from each other in the touch panel 100, but may be connected to each other through the variable short-circuited points 825, which may be controlled using a software-based control algorithm, in the switching block 820 of the sensing signal control unit 800.

The sensing input signal output unit 840 may generate the sensing input signal Vs and then transfer the sensing input signal Vs through the track lines 821_1, 821_2, . . . , 821_N. The sensing input signal Vs may include at least two different voltage levels and may include a periodic pulse. According to another exemplary embodiment of the invention, the sensing input signal Vs may be an alternating current ("AC") voltage, which is changed based on a pre-determined voltage level.

Referring to FIGS. 3 and 4, the rows of the sensing input electrodes 120 of the touch panel 100 may each receive a same sensing input signal Vs through the short-circuited points 825 of the switching block 820. The sensing input signal output unit 840 may sequentially scan and input the sensing input signal Vs from the sensing input electrodes 120 of a first row to the sensing input electrodes 120 of a final row, e.g., an n-th row.

The sensing signal processing unit 850 receives and processes the sensing output signal Vp input through the input terminals RX1, RX2, RXm. In one exemplary embodiment, for example, the sensing signal processing unit 850 may sample and performs an A/D conversion on the sensing output signal Vp.

Next, an operation of an exemplary embodiment of the touch sensing device according to the invention will be described with reference to FIGS. 3 to 5. The sensing input signal output unit 840 may sequentially input the sensing input signal Vs to the input signal lines 126_1, 126_2, . . . , 126_n connected to each other through the track lines 821_1, 821_2, . . . , 821_N and the short-circuited points 825.

Next, the sensing input signal Vs is transferred to the sensing input electrodes 120 connected to the input signal lines 126_1, 126_2, . . . , 126_n such that the sensing capacitor Cm is charged with a predetermined charge amount.

When a touch occurs on the touch panel 100, the sensing output signal Vp changed based on, e.g., substantially in proportion to, a change in the charge amount of the sensing capacitor Cm is input to the sensing signal control unit 800 through the output signal lines 134_1, 134_2, . . . , 134_m connected to the sensing output electrodes 130.

The sensing output signal Vp may be processed by the sensing signal processing unit 850 of the sensing signal control unit 800 to generate a digital sensing signal.

Next, another alternative exemplary embodiment of a touch sensing device according to the invention will be described with reference to FIGS. 6 to 8, along with the above-mentioned drawings. The same constituent elements as the above-mentioned exemplary embodiments are denoted by the same reference numerals and the same description thereof will be omitted, which is identically applied to all the exemplary embodiments.

Figure 6:
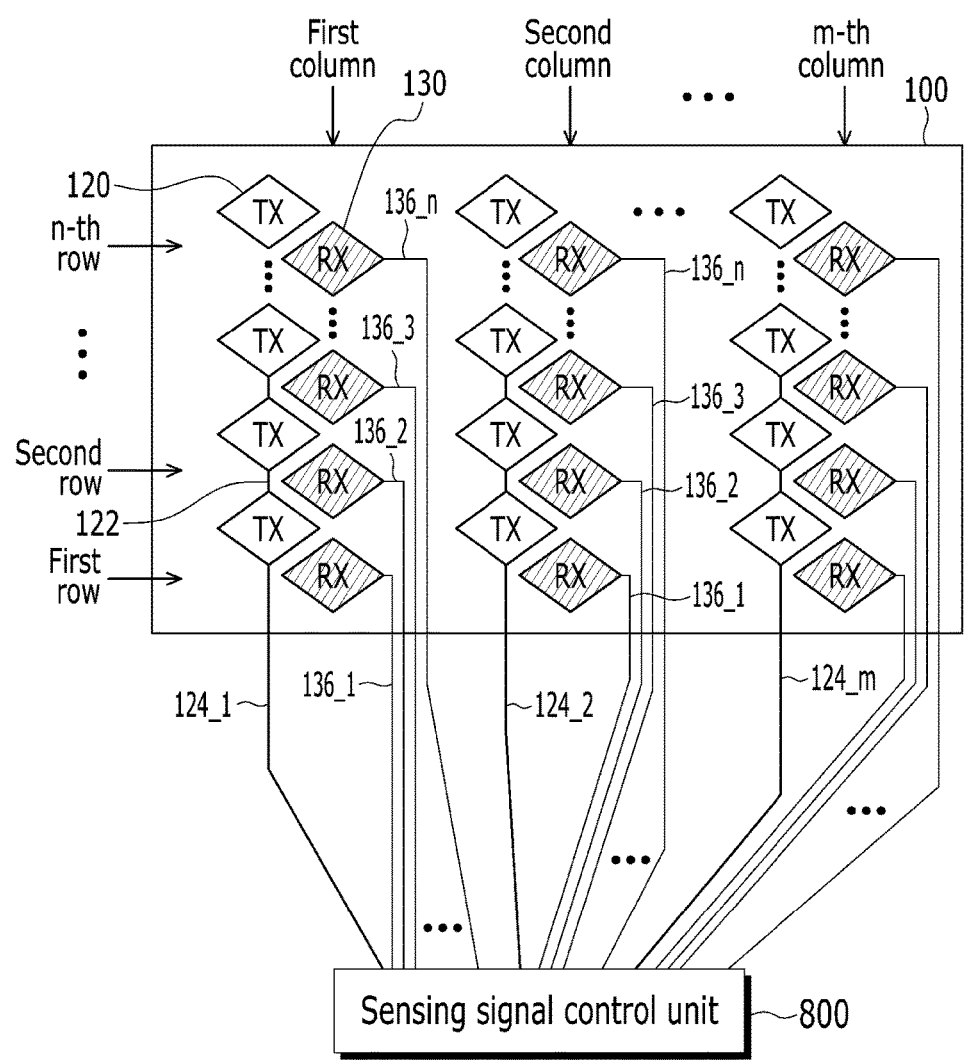
FIG. 6 is a block diagram showing another alternative exemplary embodiment of a touch sensing device according to the invention.
Figure 7:
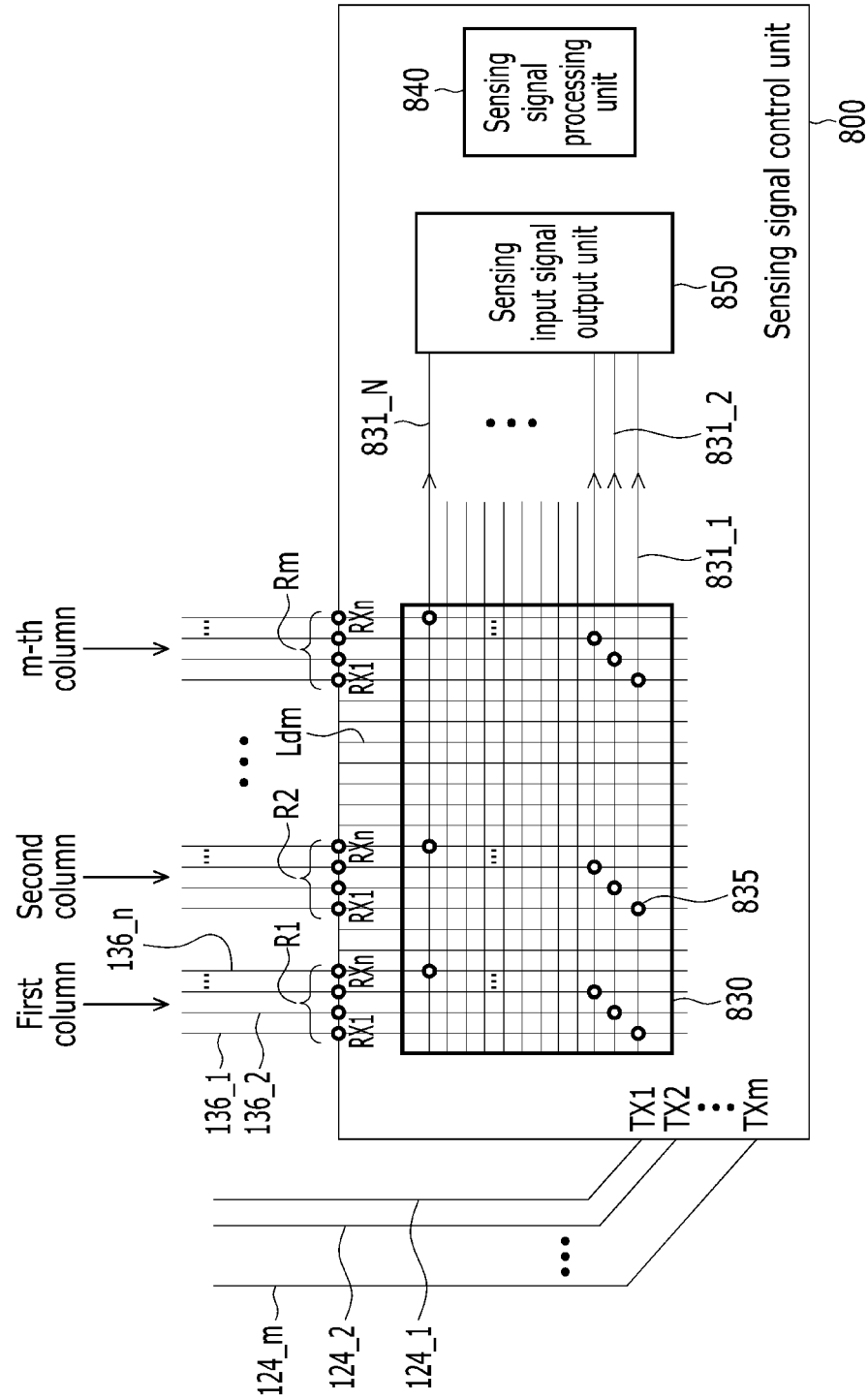
FIGS. 7 and 8 are block diagrams showing an alternative exemplary embodiment of the sensing signal control unit of the touch sensing device according to the invention.
Figure 8:
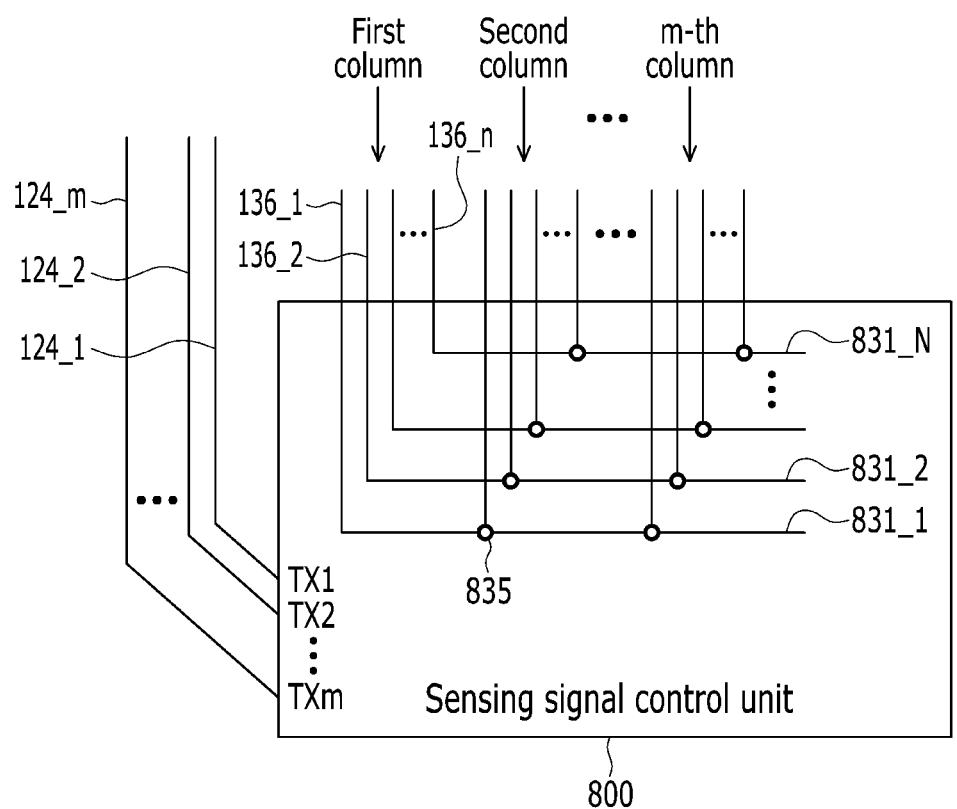

FIG. 6 is a block diagram showing another alternative exemplary embodiment of a touch sensing device according to yet another exemplary embodiment of the invention, and FIGS. 7 and 8 are block diagrams showing an alternative exemplary embodiment of the sensing signal control unit of the touch sensing device according to the invention.

The touch sensing device shown in FIGS. 6 to 8 is substantially the same as the exemplary embodiment of the touching sensing device illustrated in FIGS. 3 to 5, except for a connection of the sensing input electrodes 120 and the sensing output electrodes 130 with the sensing signal control unit 800. The same or like elements shown in FIGS. 6 to 8 have been labeled with the same reference characters as used above to describe the exemplary embodiments of the touching sensing device shown in FIGS. 3 to 5, and any repetitive detailed description thereof will hereinafter be omitted or simplified.

Referring to FIG. 6, in an exemplary embodiment, at least a portion of the sensing input electrodes 120 disposed on the touch panel 100 may be connected to each other. The sensing input electrodes 120 in the same column may be connected to each other through the connector 122, and the sensing input electrodes 120 arranged in different columns may be separated from (e.g., electrically disconnected from) each other. The columns of each of the sensing input electrodes 120 may be connected to the sensing signal control unit 800 through the input signal lines 124_1, 124_2, . . . , 124_m.

The sensing output electrodes 130 may be separated from each other in the touch panel 100. The sensing output electrodes 130 disposed in each column of the touch panel 100 may be connected to the sensing signal control unit 800 through n output signal lines 136_1, 136_2, . . . , 136_n. The output signal lines 136_1, 136_2, . . . , 136_n connected to the sensing output electrodes 130 may each be divided into m groups, each including the n output signal lines 136_1, 136_2, . . . , 136_n.

Referring to FIG. 7, the input signal lines 124_1, 124_2, . . . , 124_m connected to each row of the sensing input electrodes 120 may be connected to the output terminals TX1, TX2, . . . , TXm of the sensing signal control unit 800.

The output signal lines 136_1, 136_2, . . . , 136_n of each of the m groups connected to the sensing output electrodes 130 may be connected to the m input terminal groups R1, R2, . . . , Rm of the sensing signal control unit 800. Each of the input terminal groups R1, R2, . . . , Rm may include n input terminals RX1, RXn.

Referring to FIG. 7, an exemplary embodiment of the sensing signal control unit 800 according to the invention may include a switching block 830, the sensing input signal output unit 840 and the sensing signal processing unit 850.

The switching block 830 may be implemented in an IC form, and include the switches which may control a connection (e.g., connect or disconnect) between the output signal lines 136_1, 136_2, . . . , 136_n of the m groups and a plurality of track lines 831_1, 831_2, . . . , 831_N (here, N is a natural number) crossing the output signal lines 136_1, 136_2, . . . , 136_n. In FIG. 7, the switches may be disposed at cross points between the output signal lines 136_1, 136_2, . . . , 136_n and the track lines 831_1, 831-2, . . . , 831_N. The switches that control the connections between the output signal lines 136_1, 136_2, . . . , 136_*n* and the track lines 831_1, 831_2, . . . , 831_N may form short-circuited points 835. In such an embodiment, the positions of the short-circuited points 835 may be freely changed using a software-based control algorithm, for example.

The output signal lines **136_1, 136_2, . . . , 136_*n* of the touch panel 100 may be connected to the inside of the switching block 830 of the sensing signal control unit 800 through the input terminals RX1, RXn. The switching block 830 may further include the dummy wiring Ldm, and the dummy wiring Ldm may extend outside the switching block 830**.

The number of the track lines 831_1, 831_2, . . . , 831_N (here, N is a natural number) may be n or more. The track lines 831_1, 831_2, . . . , 831_N may extend outside the switching block 830 to be connected to the sensing signal processing unit 850.

Referring to FIG. 7, at least one of the output signal lines **136_1, 136_2, 136_*n* of each group may be electrically connectable to at least one of the output signal lines 136_1, 136_2, . . . , 136_*n* of another group through at least one of the short-circuited points 835. In one exemplary embodiment, for example, the output signal lines 136_1 connected to the sensing output electrodes 130 disposed in the first row of the touch panel 100 may be connectable to a same corresponding track line, e.g., a first track line 831_1, through the shorted-circuit points 835, the output signal lines 136_2 connected to the sensing output electrodes 130 disposed in the second row of the touch panel 100 may be connectable to a same corresponding track line, e.g., a second track line 831_2, through the short-circuited points 835, and the output signal lines 136_*n* connected to the sensing output electrodes 130 disposed in the n-th row of the touch panel 100 may be connectable to a same corresponding track line, e.g., an N-th track line 831-N, through the short-circuited points 835**. In such an embodiment, N may be equal to n.

FIG. 8 schematically illustrates the output signal lines 136_1, 136_2, . . . , 136_N connected to each other through the short-circuited points 835 and the n track lines **831_1, 831_2, . . . , 831_*n* within the switching block 830 illustrated in FIG. 7**.

In such an embodiment, as shown in FIG. 8, the sensing output electrodes 130 disposed in a same row in the touch panel 100 are separated from each other in the touch panel 100, but may be connectable to each other through the variable short-circuited points 835, which may be controlled using a software-based control algorithm, in the switching block 830 of the sensing signal control unit 800.

The sensing input signal output unit 840 may generate the sensing input signal Vs and then transfer the sensing input signal Vs to the input signal lines **124_1, 124_2, . . . , 124_*m* connected to each column of the sensing input electrodes 120 through the output terminals TX1, TX2, TXm. The sensing input signal output unit 840 may sequentially scan and input the sensing input signal Vs from the sensing input electrodes 120 of the first row to the sensing input electrodes 120** of the final row.

The sensing signal processing unit 850 receives and processes the sensing output signals Vp which are transferred through the track lines 831_1, 831_2, . . . , 831_N. The sensing signal processing unit 850 may sequentially receive the sensing output signals Vp corresponding to the scanned and input sensing input signals Vs, and sample and performs an A/D conversion on the received sensing output signals Vp.

Next, another alternative exemplary embodiment of a touch sensing device according to the invention will be described with reference to FIGS. 9 to 12, along with the FIGS. 1 to 8.

Figure 9:
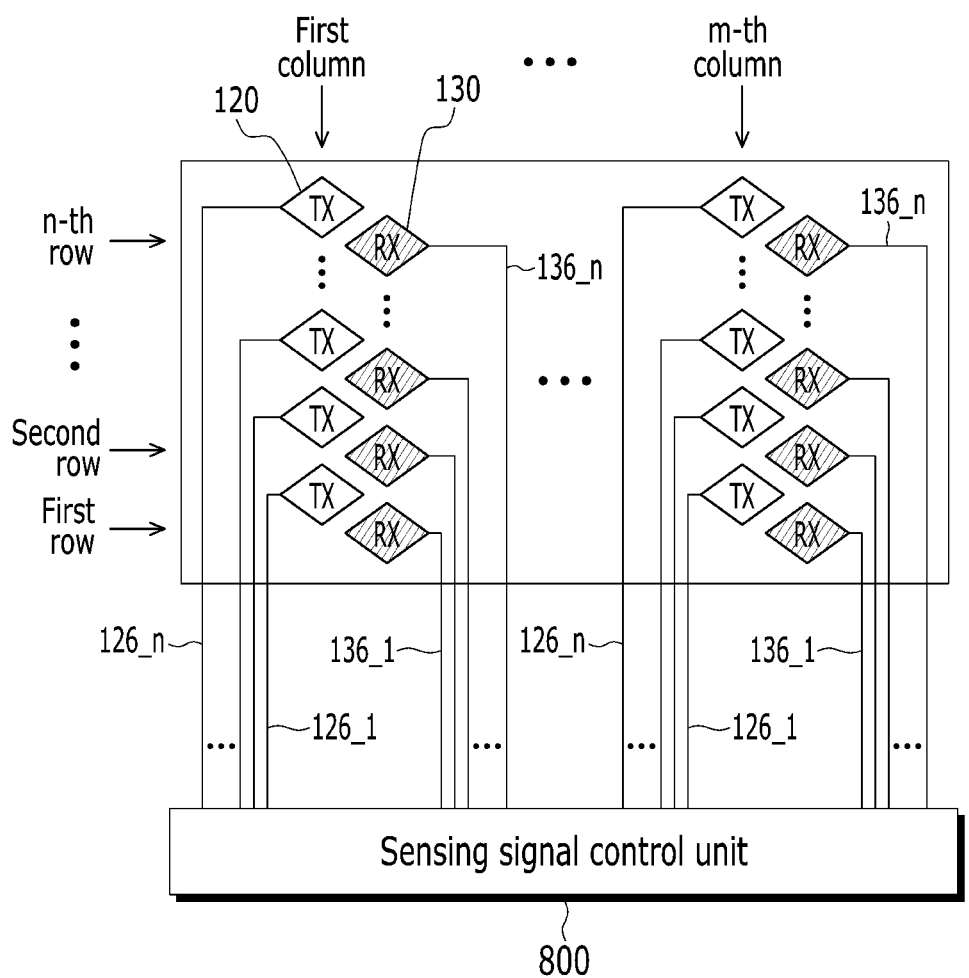
FIG. 9 is a block diagram showing another alternative exemplary embodiment of a touch sensing device according to the invention.
Figure 11:
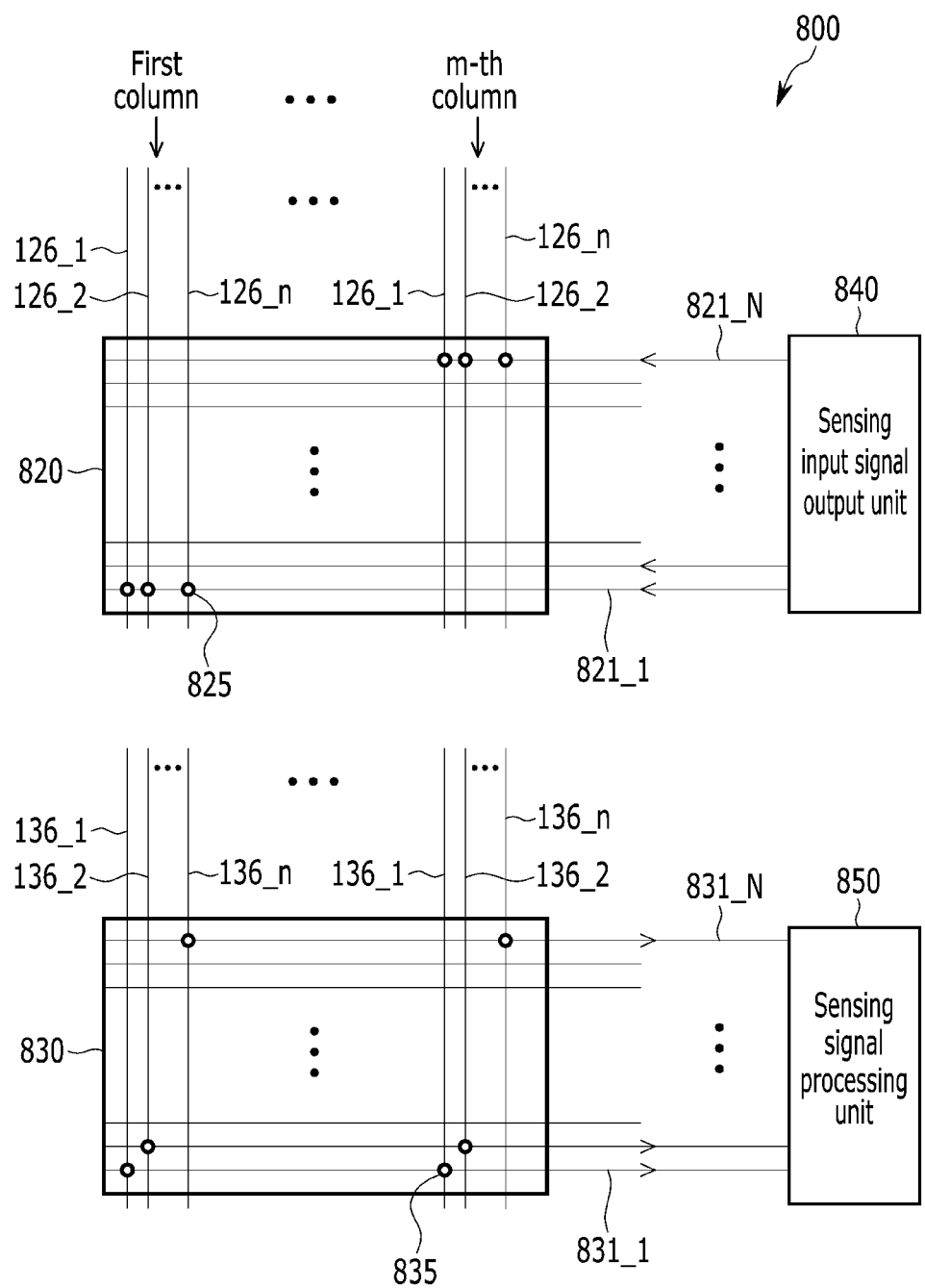

FIG. 9 is a block diagram showing another alternative exemplary embodiment of a touch sensing device according to the invention, and FIGS. 10 to 12 are block diagrams showing an alternative exemplary embodiment of a sensing signal control unit of the touch sensing device according to the invention.

The touch sensing device shown in FIGS. 9 to 12 is substantially the same as the exemplary embodiments of the touching sensing device illustrated in FIGS. 3 to 8, except that the sensing input electrodes 120 are not connected to each other in the touch panel 100 and may be variably connected to each other in the switching block 820 of the sensing signal control unit, and the sensing output electrodes 130 are not connected to each other in the touch panel 100 and may be variably connected to each other in the switching block 830 of the sensing signal control unit. The same or like elements shown in FIGS. 9 to 12 have been labeled with the same reference characters as used above to describe the exemplary embodiments of the touching sensing device shown in FIGS. 3 to 8, and any repetitive detailed description thereof will hereinafter be omitted or simplified.

Referring to FIG. 9, the sensing input electrodes 120 may be separated (e.g., electrically disconnected) from each other in the touch panel 100. In an exemplary embodiment, the sensing input electrodes 120 disposed in each column of the touch panel 100 may be connected to the sensing signal control unit 800 through the n input signal lines **126_1, 126_2, . . . , 126_*n*. The input signal lines 126_1, 126_2, . . . , 126_*n* connected to the sensing input electrodes 120 may each be divided into m groups, each including the n input signal lines 126_1, 126_2, . . . , 126_*n***.

In such an embodiment, the sensing output electrodes 130 may be separated from each other in the touch panel 100. The sensing output electrodes 130 disposed in each column of the touch panel 100 may be connected to the sensing signal control unit 800 through the n output signal lines **136_1, 136_2, . . . , 136_*n*. The output signal lines 136_1, 136_2, . . . , 136_*n* connected to the sensing output electrodes 130 may each be divided into m groups, each including the n output signal lines 136_1, 136_2, . . . , 136_*n***.

Referring to FIGS. 10 to 12, an exemplary embodiment of the sensing signal control unit 800 according to the invention may include two switching blocks, e.g., a first switching block 820 and a second switching block 830, the sensing input signal output unit 840, and the sensing signal processing unit 850.

The first switching block 820 includes a plurality of switches which may control a connection, (e.g., connect or disconnect) between the input signal lines **126_1, 126_2, . . . , 126_*n* of the m groups and a plurality of first track lines 821_1, 821_2, . . . , 821_N (here, N is a natural number) crossing the input signal lines. In FIGS. 10 to 12, the switches may be disposed at the cross points between the input signal lines 126_1, 126_2, . . . , 126_*n* and the first track lines 821_1, 821_2, . . . , 821_N. The switches for controlling the connection between the input signal lines 126_1, 126_2, . . . , 126_*n* and the first track lines 821_1, 821_2, . . . , 821_N may form the short-circuited points 825. In such an embodiment, the positions of the short-circuited points 825** may be freely changed using a software-based control algorithm, for example.

The input signal lines **126_1, 126_2, . . . , 126_*n* of the touch panel 100 may be connected to the inside of the switching block 820 of the sensing signal control unit 800. The first track lines 821_1, 821_2, . . . , 821_N may extend outside the switching block 820 to be connected to the sensing input signal output unit 840**.

The second switching block 830 includes a plurality of switches which may control a connection (e.g., connect or disconnect) between the output signal lines 136_1, 136_2, . . . , 136_n of the m groups and a plurality of second track lines 831_1, 831_2, . . . , 831_N crossing the output signal lines. In FIGS. 10 to 12, the switches may be disposed at the cross points between the output signal lines 136_1, 136_2, . . . , 136_n and the second track lines 831_1, 831-2, . . . , 831_N. The switches for controlling the connection between the output signal lines 136_1, 136_2, . . . , 136_n and the second track lines 831_1, 831_2, . . . , 831_N may form the short-circuited points 835. In such an embodiment, the positions of the short-circuited points 835 may be freely changed using a software-based control algorithm, for example.

The output signal lines 136_1, 136_2, . . . , 136_n of the touch panel 100 may be connected to the inside of the switching block 830 of the sensing signal control unit 800. The second track lines 831_1, 831_2, . . . , 831_N may extend outside the switching block 830 to be connected to the sensing signal processing unit 850.

The other configurations of the first switching block 820 and the second switching block 830 of the exemplary embodiment of The touch sensing device shown in FIGS. 9 to 12 may be substantially the same as the switching blocks 820 and 830 of the exemplary embodiments illustrated in FIGS. 3 to 8 described above, and any repetitive detailed description thereof will be omitted.

In an exemplary embodiment, the positions of the short-circuited point 825 of the first switching block 820 may be freely set therein. Therefore, in such an embodiment, the sensing input electrodes 120 of the touch panel 100 may be freely connected to each other and may be each connected to the first track lines 821_1, 821_2, . . . , 821_N independent of each other to be connected to the sensing input signal output unit 840. The sensing input electrodes 120 connected to each other through the first switching block 820 may receive a same sensing input signal Vs.

In an exemplary embodiment, the positions of the short-circuited points 835 of the second switching block 830 may be freely set therein. Therefore, in such an embodiment, the sensing output electrodes 130 of the touch panel 100 may be freely connected to each other, and each of the sensing output electrodes 130 of the touch panel 100 may be connected to the second track lines 831_1, 831_2, . . . , 831_N independent of each other to be connected to the sensing signal processing unit 850. The sensing output electrodes 130 connected to each other through the second switching block 830 may transfer each sensing output signal Vp to the sensing signal processing unit 850 through a same wiring.

Referring to FIG. 10, in an exemplary embodiment, the sensing input electrodes 120 disposed in a same row in the touch panel 100 may be connected to each other through the short-circuited points 825 of the switching block 820, and may receive a same sensing input signal Vs.

In such an embodiment, as shown in FIG. 11, the sensing input electrodes 120 disposed in a same column in the touch panel 100 may be connected to each other through the short-circuited points 825 of the switching block 820, and may receive a same sensing input signal Vs.

According to an exemplary embodiment, as illustrated in FIGS. 10 and 11, the sensing input signal output unit 840 may sequentially scan and input the sensing input signals Vs from the sensing input electrodes 120 of the first row or the first column to the sensing input electrodes 120 of the final row or the final column.

In such an embodiment, at least a portion of the sensing input electrodes 120 may be connected to each other in various manners.

Referring to FIG. 12, each of the sensing input electrodes 120 may receive a corresponding sensing input signal Vs through the first track lines 821_1, 821_2, . . . , 821_N, which are separated from each other.

In an exemplary embodiment, referring to FIG. 10, the sensing output electrodes 130 disposed in a same column in the touch panel 100 may be connected to each other through the short-circuited points 835 of the switching block 830.

In such an embodiment, as shown in FIG. 11, the sensing output electrodes 130 disposed in a same row in the touch panel 100 may be connected to each other through the short-circuited points 835 of the switching block 830.

According to an exemplary embodiment, as illustrated in FIGS. 10 and 11, the sensing output signals Vp, which are output corresponding to the scanned and input sensing input signals Vs, may be input to and processed by the sensing signal processing unit 850 through a same wiring.

Further, at least a portion of the sensing output electrodes 130 may be connected to each other in various manners.

In an alternative exemplary embodiment, as shown in FIG. 12, the respective sensing output electrodes 130 may transfer the respective sensing output signals Vp through the second track lines 831_1, 831_2, . . . , 831_N, separated from each other.

The sensing input signal output unit 840 may generate the sensing input signal Vs and then transfer the sensing input signal Vs through the first track lines 821_1, 821_2, . . . , 821_N. The sensing input signal output unit 840 may sequentially scan and input the sensing input signals Vs through the first track lines 821_1, 821_2, . . . , 821_N.

The sensing signal processing unit 850 receives and processes the sensing output signals Vp, which are transferred through the second track lines 831_1, 831_2, . . . , 831_N. The sensing signal processing unit 850 may sequentially receive the sensing output signals Vp, which are corresponding to the scanned and input sensing input signals Vs, and sample and performs an A/D conversion on the received sensing output signals Vp.

According to an exemplary embodiment of the invention, the short-circuited points 825 and 835 of the switching blocks 820 and 830 may be freely set based on a state of the touch sensing device, use environment, purpose, and the like, of the touch sensing device to freely define the connection among the sensing input electrodes 120 or the sensing output electrodes 130.

Next, another alternative exemplary embodiment of the touch sensing device according to the exemplary embodiment of the invention will be described with reference to FIG. 13.

FIG. 13 is a block diagram showing another alternative exemplary embodiment of the sensing signal control unit of the touch sensing device according to the invention.

Referring to FIG. 13, in an exemplary embodiment of the touch sensing device according to the invention, each of the sensing input electrodes 120 receives a corresponding sensing input signal Vs through a corresponding track line of the first track lines 821_1, 821_2, . . . , 821_N separated from each other, and each of the sensing output electrodes 130 transfers a corresponding output signal Vp through a corresponding second track line of the track lines 831_1,

831_2, ..., 831_N, as described above with reference to FIG. 12. In such an embodiment, the sensing input electrodes 120 and the sensing output electrodes 130 may each function as independent sensing electrodes, that is, may each sense electrodes independent of each other. In such an embodiment, each of the sensing input electrodes 120 or each of the sensing output electrodes 130 may each function as an independent sensing electrode.

In an exemplary embodiment, the input signal lines 126_1, 126_2, ..., 126_n connected to the sensing input electrodes 120 may be connected to a first sensing signal input and processing unit 860 through the switching block 820 to receive the sensing input signals Vs and output the sensing output signals Vp. In such an embodiment, the input signal lines 136_1, 136_2, ..., 136_n connected to the sensing output electrodes 130 may be connected to a second sensing signal input and processing unit 870 through the switching block 830 to receive the sensing input signals Vs and output the sensing output signals Vp.

In an exemplary embodiment, the sensing input electrodes 120 and the sensing output electrodes 130 may be set to collectively form a mutual sensing capacitor as described above with reference to FIG. 1. In such an embodiment, each of the sensing input electrodes 120 or each of the sensing output electrodes 130 may be set to form a self-sensing capacitor that functions as a touch sensor such that each of the sensing input electrodes 120 or each of the sensing output electrodes 130 receives a corresponding sensing input signal Vs and then be charged with a predetermined charge amount. Next, when a touch occurs thereon by an external object such as a finger, the charged charge amount of the self-sensing capacitor is changed, thereby outputting a sensing output signal Vp different from the input sensing input signal V. In such an embodiment, the touch information such as an occurrence and location of the touch on the touch panel 100 based on the sensing output signal Vp.

According to an exemplary embodiment of the invention as described above, the positions of the short-circuited points 825 and 835 may be freely changed in the first and second switching blocks 820 and 830, such that a touch sensing of a touch on the touch panel 100 may be performed based on a touch sensing method using the mutual sensing capacitor Cm or a touch sensing method using the self-sensing capacitor, which may be converted from each other, thereby sensing a touch in various methods. According to an exemplary embodiment of the invention, the sensing signal control unit 800 may further include a mode selection unit (not illustrated) which may select one of a touch sensing mode using the mutual sensing capacitor Cm and a touch sensing mode using the self-sensing capacitor.

Hereinafter, exemplary embodiments of the sensing input electrode and the sensing output electrode of the touch sensing device according to the invention will be described with reference to FIGS. 14 and 15.

Figure 14:
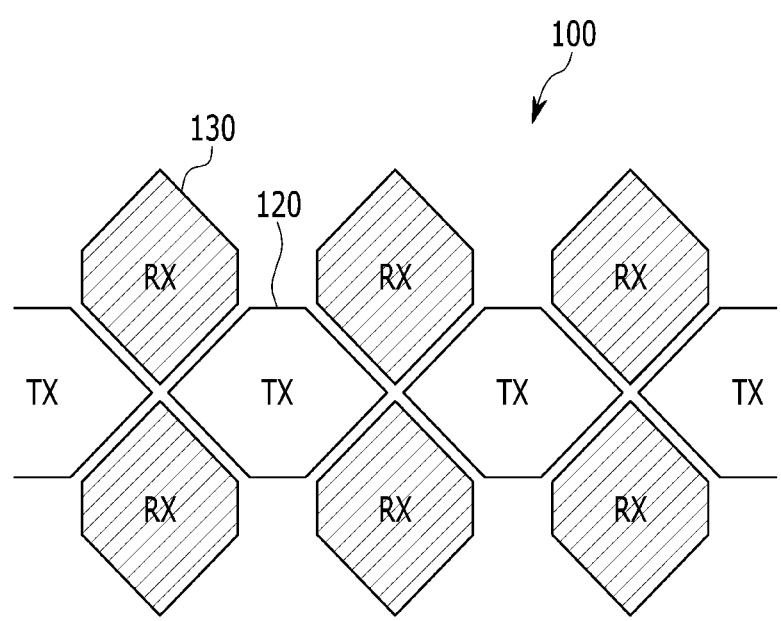
FIGS. 14 and 15 are plan views of exemplary embodiments of a sensing input electrode and a sensing output electrode of the touch sensing device according to the invention.
Figure 15:
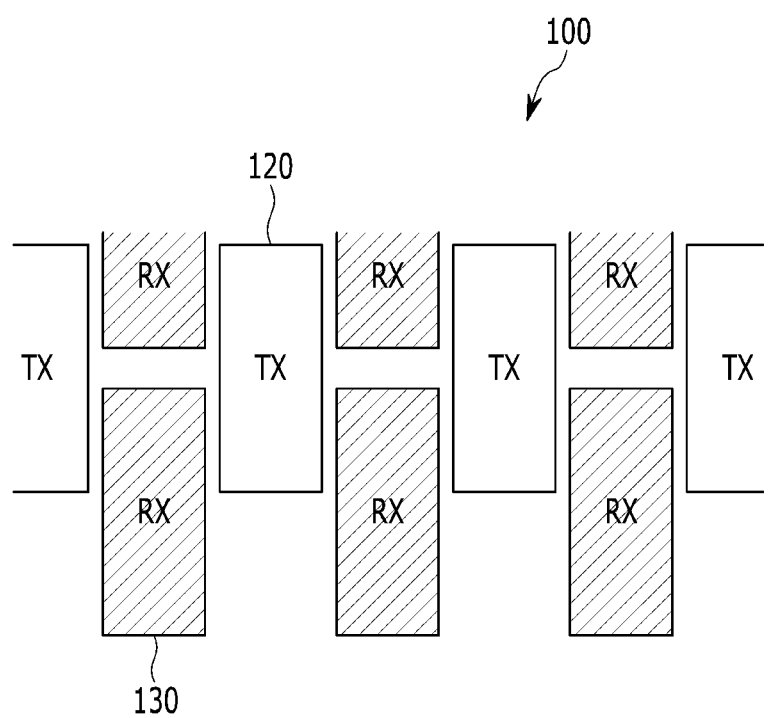

FIGS. 14 and 15 are plan views illustrating exemplary embodiments of the sensing input electrodes and the sensing output electrodes of the touch panel 100 of the touch sensing device according to the invention.

Referring to FIG. 14, an exemplary embodiment of the sensing input electrode 120 according to the invention may have a shape, in which top and bottom vertex portions are cut from a quadrangle such as a diamond. In such an embodiment, the sensing output electrode 130 may have a shape in which left and right vertex portions are cut from a quadrangle such as a diamond.

Referring to FIG. 15, in an alternative exemplary embodiment, the sensing input electrode 120 and the sensing output electrode 130 may each have a rectangular shape.

In another alternative exemplary embodiment, the sensing input electrode 120 and the sensing output electrode 130 may have various shapes such as various polygonal shapes or various circular shapes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch sensing device, comprising:
   a touch panel comprising:
      a plurality of first electrodes arranged substantially in a matrix form; a plurality of second electrodes arranged substantially in a matrix form; a plurality of first signal lines respectively connected to the plurality of first electrodes; and a plurality of second signal lines respectively connected to the plurality of second electrodes, the plurality of second electrodes being separated from the plurality of first electrodes; and
   a sensing signal control unit connected to the touch panel, wherein the sensing signal control unit comprises a first switching block, a second switching block, and a mode selection unit for selecting a mode between a self-sensing mode and a mutual-sensing mode,
   wherein
   the first switching block comprises a plurality of first switches which are respectively connected between the plurality of first signal lines and a plurality of first track lines, the plurality of first track lines crossing the plurality of first signal lines,
   the second switching block comprises a plurality of second switches which are respectively connected between the plurality of second signal lines and a plurality of second track lines, the plurality of second track lines crossing the plurality of second signal lines,
   at least two of the plurality of first signal lines are electrically connected to a same first track line of the plurality of first track lines through the first switches which are short-circuited in the mutual-sensing mode, and
   the plurality of first signal lines are electrically connected to different first track lines of the plurality of first track lines from each other through the first switches which are short-circuited in the self-sensing mode.

2. The touch sensing device of claim 1, wherein
   the at least two first signal lines connected to the same first track line are connected to the first electrodes disposed in a same row or in a same column in the mutual-sensing mode.

3. The touch sensing device of claim 2, wherein
   one among the first electrodes and the second electrodes receives a sensing input signal from the sensing signal control unit, and the other among the first electrodes and the second electrodes outputs a sensing output signal to the sensing signal control unit.

4. The touch sensing device of claim 1, wherein
   one among the first electrodes and the second electrodes receives a sensing input signal from the sensing signal control unit, and the other among the first electrodes and the second electrodes outputs a sensing output signal to the sensing signal control unit.

5. The touch sensing device of claim 2, wherein
at least two of the second signal lines are electrically connected to a same second track line of the plurality of second track lines through the second switches which are short-circuited in the mutual-sensing mode.

6. The touch sensing device of claim 5, wherein
the at least two second signal lines connected to the same second track line are connected to the second electrodes disposed in a same row or in a same column in the mutual-sensing mode.

7. The touch sensing device of claim 6, wherein
when the at least two first signal lines connected to the same first track line are connected to the first electrodes disposed in a same row, the at least two second signal lines connected to the same second track line are connected to the second electrodes disposed in a same column.

8. The touch sensing device of claim 7, wherein
all of the first electrodes disposed in the same row are conceded to the same first rack line through the at least two first signal lines.

9. The touch sensing device of claim 8, wherein
one among the first electrodes and the second electrodes receives a sensing input signal from the sensing signal control unit, and the other among the first electrodes and the second electrodes outputs a sensing output signal to the sensing signal control unit.

10. The touch sensing device of claim 1, wherein
the plurality of second signal lines are electrically connected to different second track lines of the plurality of second track lines from each other through the second switches which are short-circuited in the self-sensing mode.

11. The touch sensing device of claim 10, wherein
each of the plurality of first electrodes and the plurality of second electrodes receives a sensing input signal and outputs a sensing output signal, individually.

12. A touch sensing device, comprising:
a touch panel comprising a plurality of electrodes arranged substantially in a matrix form, and a plurality of signal lines respectively connected to the plurality of electrodes; and
a sensing signal control unit connected to the touch panel and comprising a switching block,
wherein
the switching block comprises the plurality of signal lines, a plurality of track lines, and a plurality of switches,
all of the plurality of track lines cross each of the plurality of signal lines in the switching block at crossing points, and
every crossing point of the crossing points of the plurality of signal lines and the plurality of track lines includes a switch of the plurality of switches for connecting or disconnecting between the corresponding signal line and the corresponding track line,
wherein the plurality of signal lines are electrically connected to different track lines of the plurality of first track lines from each other through the switches which are short-circuited in a self-sensing mode.

13. The touch sensing device of claim 12, wherein
at least two of the plurality of signal lines are electrically connected to a same first track line of the plurality of track lines through the switches which are short-circuited in a mutual-sensing mode.

14. The touch sensing device of claim 13, wherein
the at least two signal lines connected to the same track line are connected to the electrodes disposed in a same row or in a same column in the touch panel.

15. A touch sensing device, comprising:
a touch panel comprising a plurality of electrodes arranged substantially in a matrix form, and a plurality of signal lines respectively connected to the plurality of electrodes; and
a sensing signal control unit connected to the touch panel and comprising a switching block,
wherein
the switching block comprises the plurality of signal lines, a plurality of track lines, and a plurality of switches,
the plurality of electrodes include a first column including a plurality of first electrodes among the plurality of electrodes,
the plurality of track lines cross the signal lines connected to the plurality of first electrodes each not crossing any other electrode of the plurality of electrodes in the switching block,
the signal lines connected to the plurality of first electrodes are selectively connected to a same track line or different track lines of the plurality of track lines, and
the signal lines connected to the plurality of first electrodes are electrically connected to the different track lines from each other through the switches which are short-circuited in a self-sensing mode.

16. The touch sensing device of claim 15, wherein
the signal lines connected to the plurality of first electrodes are electrically connected to the same first track line through the switches which are short-circuited in a mutual-sensing mode.

17. The touch sensing device of claim 12, wherein
a portion of the plurality of electrodes receives a sensing input signal from the sensing signal control unit, and another portion of the plurality of electrodes outputs a sensing output signal to the sensing signal control unit.

* * * * *